2,948,987

SELECTIVE GAMETOCIDAL PROCESS

Le Roy Powers, Fort Collins, Colo., and John W. Dudley, Raleigh, N.C., assignors to the United States of America as represented by the Secretary of Agriculture No Drawing. Filed June 3, 1959, Ser. No. 817,959

14 Claims. (Cl. 47—58)

(Granted under Title 35, U.S. Code (1952), sec. 266)

A non-exclusive, irrevocable, royalty-free license in the invention herein described, throughout the world for all purposes of the U.S. Government, with the power to grant sublicenses for such purposes, is hereby granted to the Government of the United States of America.

This invention deals with a selective gametocidal process for inducing male sterility in plants of the species Beta vulgaris, L., the cultivated forms of which include sugar beets, the common garden beet, mangel, and Swiss chard. More particularly, a preferred aspect of this invention relates to a selective gametocidal process for inducing male sterility in sugar beets.

By inducing male sterility, a means is provided for production of hybrid seed which in turn makes possible the utilization of hybrid vigor in the production of the plant crops. The present process is conducted by applying to the plants specific chlorinated aliphatic acids or derivatives yielding anions of these acids, to be more fully explained hereinafter. These acids and salts inhibit, retard, delay or prevent the formation of fertile pollen in the sugar beets without apparently adversely affecting the ovules. During the period of time that little or no fertile pollen is produced, the plants are ideally suited to cross-fertilization by natural means. The resulting cross-bred plants if of the proper parentage, exhibit the vigor characteristic of certain hybrids. This vigor may take the form of increased yield of roots, increased yield of seed, including increased germination rate, enhanced disease resistance, increased sucrose content, among others. All of these aspects have commercial significance, particularly the increase in yield of roots and in sucrose content of these roots where sugar beets are the desired crop. Not all of the cross-bred sugar beets will exhibit all of the above-mentioned benefits, but many will show more than one of these benefits. Some may show all of them. In any case, the observance of any of the aforementioned results is of significant importance, particularly in the sugar beet industry. The results in any particular case will vary according to the populations concerned, conditions of growth, and other factors recognized and understood by those skilled in the science and art of plant breeding.

The compounds which may be used in the practice of this invention are those compounds which in water-solution form anions of a chlorinated aliphatic acid which contains from two to four carbon atoms and at least two chlorine atoms. Specifically, these acids are 2,3-dichloroisobutyric acid, trichloroacrylic acid, 2,3-dichloropropionic acid, 2,2,3-trichloropropionic acid, 2,3,3,3-tetrachloroisobutyric acid, 2,2-dichloropropionic acid, 2,2,3-trichloro-n-butyric acid, and 2,3,3'-trichloroisobutyric acid. These acids may be used as the free acid or in the form of their salts, examples of which are the sodium, potassium, iron, aluminum, cadmium, calcium, nickel, copper, zinc, manganese, and barium salts, and the ammonium salts formed with ammonia, amines or quaternary ammonium groups, including monomethylamine, dimethylamine, trimethylamine, the ethylamines, ethanolamine, dimethylethanolamine, morpholine, pyrrolidine, or pyridine, or such quaternary groups as tetramethylammonium, benzyltrimethylammonium, dibenzyldimethylammonium, methylpyridinium, or methylmorpholinium, didodecenyl-dimethylammonium, N-dodecyl - N - benzyl-N,N-dimethylammonium, N-dodecylbenzyl - N,N,N - trimethylammonium, or octylphenoxyethylbenzyldimethylammonium. The above compounds will, of course, exhibit varying degrees of water-solubility, but measurable amounts of anions will be found in all instances. It has also been observed that in the above-described compounds it is possible to replace one chlorine atom with a cyano group, particularly in compounds originally containing three or four chlorine atoms. In such instances, the single cyano group appears to contribute activity similar to the replaced chlorine atom. In addition, when a cyano group is present, the compound may be used in the form of a lower ester, as well as the free acid or salt form. The use of the single cyano group in place of one chlorine atom is to be construed as within the gamut of this invention. Specifically and illustratively in this respect, there may be employed methyl 3-cyano-2,3-dichloroacrylate. The above compounds may be used singly or in combinations, as desired.

In practicing this invention, the area in which the hybrid seed is to be produced is planted with at least two populations of the species Beta vulgaris, L. The populations may be of the same or different varieties of a particular member of the species. The two or more populations are planted in any desired manner, but it should be kept in mind that as a matter of practical expediency the planting is preferably done so that commercially available equipment may be advantageously employed. The populations are preferably planted in such a manner that the plants of each population are in close proximity with each other, such as in alternate rows or in an arrangement of two rows of one population with one row of another population, or in any other desired manner as understood and appreciated by the geneticist and plant breeder. It is emphasized that the process of this invention does not depend on any particular geometric arrangement of plants and any systematic mixed planting of the area concerned may be practiced which on the one hand places the two populations sufficiently close to each other to encourage cross-fertilization yet sufficiently separated to allow for the spraying or dusting of one variety without any appreciable exposure of the other. The same principle applies when more than two populations are to be used.

To effect male-sterility or substantial male-sterility in one of the populations, that population is treated with the chlorinated aliphatic acid or a salt thereof by spraying or dusting. The rate of application should be such as to affect substantially the male gametophytes but insufficient to cause substantial injury to the plant or the female gametophytes. This will depend to a large degree on many factors, such as the growing stage of the plant, conditions of climate, concentration and total dosage of the applied compound, and to some degree upon the particular population being treated. It has been observed that all populations do not give equal response to apparently identical treatment. The optimum dosage will also vary with the particular compound being used as they are not all equally active and some tend to be more phytotoxic to the plants than others. A good practical rule is to apply the chlorinated aliphatic acid or salt at a rate at which slight injury to the plant occurs but from which it will recover, or at a rate slightly below the point of serious plant injury or serious seed impairment. In the case of 2,3-dichloroisobutyric acid and its water-soluble salts, which are the preferred compounds of this invention, it has been observed that seed reduction is indicated at an application rate of about 25 pounds per acre. At rates considerably greater than 25 pounds per acre, the yield of seed may be significantly affected. When the relatively insoluble salts are employed, the rate may be increased several fold. A simple test on comparatively few plants will readily show whether the particular spray concentration and application rate cause undesirable effects, as will be apparent to one skilled in the art. Useful results are obtainable at considerably lower rates and as little as two and one-half pounds per acre of active ingredient will produce desirable results. Indications are that as little as one pound per acre shows significant effects.

The chlorinated aliphatic carboxylic acids or salts thereof should be applied as a water-solution or as a dust. The concentration of active ingredient in the aqueous or dust formulation is important as well as the total dosage employed. The concentration by weight of active ingredient may vary from 0.1 to 4.0%, preferably from 0.25 to 2.0%. The total dosage ranges from one pound to seventy-five pounds per acre, preferably from two and one-half to about twenty-five pounds per acre. The highest portion of the range indicates triple treatments of highest concentrations of the active material. The lowest portion of the range indicates a single treatment of lowest concentrations of the active material, as will be further explained hereinafter. Generally, higher concentrations of active material should be used in dust formulations than in comparable spray formulations in order to achieve similar results.

If desired, it is possible to employ in small but effective amounts wetting agents in the spray formulation containing water and the active material. Suitable in this respect are dodecylbenzene sodium sulfonate, sodium dodecyl sulfate, dodecyltrimethylammonium chloride, and octylphenoxypolyethoxyethanol, or the like. If a wetting agent is contemplated, it should not be employed in circumstances where varying tendencies toward phytotoxicity of the spray would be created or aggravated.

If a dust formulation is desirable, one incorporates the active material with inert carriers such as finely comminuted clays, talc, pyrophyllite, diatomaceous earth, magnesium carbonate, or the like, with or without the addition of dispersing or wetting agents. There also may be incorporated into the above aqueous or dust formulations various compatible insecticidal, fungicidal, or other pesticidal agents according to known techniques.

The time of the application of the chlorinated aliphatic carboxylic acids and their salts to the sugar beets is important. There are three stages of growth of the sugar beets during which time application of the defined active ingredient may be advantageously made. These three stages of growth are all prior to flowering and are identified as emergence, early bolting, and pollen mother cell stages. The emergence stage is that time when the plant has established itself above the ground in the form of low growth but seed stalks are not yet apparent. The early bolting stage is that time when the seed stalk is formed but flower buds are not readily observable. The pollen mother cell stage is that stage when flower buds have formed but have not yet opened, that is, before flowering. It is during these three stages and not appreciably before or after that the present process must be practiced. In some instances, application at the emergence stage is adequate. In other cases, just at the early bolting or pollen mother cell stage is satisfactory. Or it may be that application at two or all three stages of growth is most desirable. If two applications are contemplated, it is usually preferable to make them at two consecutive growth stages, although this may not always be important. As indicated previously, the results may vary from population to population, and are affected by concentration and dosage of active material and climatic conditions, among others. If more than one application is contemplated, it is preferable to use a single application within any particular growth stage rather than have multiple applications within the same growth stage.

The present invention applies to sugar beets generally, but may very well be more effective with some populations than with others, as has been indicated previously. Also, as stated heretofore, other known variables are present which affect the overall results of the present process, as will be understood by those skilled in the science and art. However, in all cases, substantial successful hybridization in varying degrees was directly attributable to the process of the present invention. By means of the present process, there is available an effective, convenient, and relatively inexpensive means for inducing male sterility, providing a means for hybridization, and eventually resulting in the utilization of hybrid vigor in sugar beet production. This process may be more fully and clearly understood from the following illustrative examples. Various modifications may be made, of course, within the gamut and spirit of this invention.

EXAMPLE 1

There were planted in a greenhouse 40 quarter roots each of two U.S.D.A. inbred lines 52–407 and 54–565. The 52–407 has a red root and red hypocotyl and the 54–565 has a yellow root. The quarters of each of these lines were alternated. Spray applications consisted of an aqueous solution containing 0.5% by weight of sodium 2,3-dichloroisobutyrate applied at the rate of 100 gallons per acre. Alternate pairs of plants, one of each inbred were sprayed, care being taken to assure that no spray reached the untreated plants. Thus, one-half of the plants of each line were treated while the other half of the plants were untreated and served as pollen parents and as a check on the effectiveness of the spray applications. Of the pairs of plants that were sprayed, one-half were given two applications of the same concentration, one at the emergence stage and another at the early bolting stage (14 days later). The other pairs of plants that were sprayed were given an additional spraying of the same concentration at the pollen mother cell stage (14 days after the early bolting stage spraying). The results of cross-fertilization were determined by hypocotyl color counts on seed obtained from 54–565, the yellow rooted parent. The check plants, that is, those untreated, showed cross-fertilization in the amount of 3.5%. Those plants that had been sprayed twice showed cross-fertilization in the amount of 13.9%, or about four times as great as the amount attributable to chance and natural factors. The plants that had been sprayed three times showed cross-fertilization in the amount of 40.3% or over eleven times the amount found in the check plants. At the same time, the mean seed yield per plant was slightly increased in the population 54–565 at the two spray level and only slightly reduced at the three application level. The seed yield in the population 52–407 indicated that some genotypes can stand heavier applications of the active material than other populations without significant reduction in seed yield. The percent germination of the seedballs from both populations showed a significant increase over the check at the two spray level.

EXAMPLE 2

A field experiment was established based on a modified split-split plot design with four replications. The whole plots were varieties, the sub-plots were time of application, and the sub-sub plots were concentrations of sodium 2,3-dichloroisobutyrate in percent by weight in water. The plant material consisted of 192 roots from each of three commercial varities: Great Western 359–52R (A54–1); Midwest 391 (A54–6); and American Crystal 2(A54–7). A total of 576 roots was used. Each replication consisted of three blocks, each block representing a variety. Each variety block was divided into groups of four rows. One group was given an initial application at emergence (20 days after planting). A second group was given an initial application at early bolting (10 days after the emergence spraying). A third group was given an initial spraying at the pollen mother cell stage (8 days after early bolting spraying). One row within each group was untreated and served as a check and a pollen source. One row within each group was given a treatment of 0.33%, one 1.0%, and one 3.0% by weight of sodium 2,3-dichloroisobutyrate in an aqueous spray applied at the rate of 100 gallons per acre. All rates throughout the test are based on 100 gallons per acre. Each row consisted of four plants spaced two feet apart with three feet between rows.

Modifications of the split-split plot design were made to obtain information on the effect of repeated applications. Each plot treated at the emergence stage was split in half and one-half chosen at random was given repeat treatments at the early bolting and pollen mother cell stages while the other half was given only the emergence spraying. The plots treated at the early bolting stage were also divided and one-half was given an additional treatment at the pollen mother cell stage. The following diagram perhaps more clearly depicts this field test. In this diagram, the following symbols are employed:

A=single application
B=two applications
C=three applications
E=emergence stage
EB=early bolting stage
PMC=pollen mother cell stage

*Diagram*

ONE REPLICATION OF FIELD TEST

| Variety A54-1 | Variety A54-7 | Variety A54-6 |
|---|---|---|
| check<br>x x     x x<br>B 1.0% A<br>x x     x x<br>EB<br>A 0.33% B<br>x x     x x<br>B 3.0% A<br>x x     x x | PMC | PMC |
| A 1.0% C<br>x x     x x<br>check<br>x x     E    x x<br>A 3.0% C<br>x x     x x<br>C 0.33% A<br>x x     x x | E | EB |
| check<br>x x     x x<br>1.0%<br>x x     x x<br>PMC 0.33%<br>x x     x x<br>3.0%<br>x x     x x | EB | E |

The most effective treatments for delaying pollen shedding were observed with single applications at the early bolting and pollen mother cell stages at concentrations of 1.0 to 3.0% wherein pollen shedding was delayed 10 to 12 days. A single application of 0.33% at the pollen mother cell stage and a single application of 3.0% at the emergence stage delayed pollen shedding at least seven days. All of the multiple applications delayed pollen shedding at least seven days.

Two 3.0% applications, one at the early bolting and one at the pollen mother cell stage, resulted in no plants shedding pollen. Of the single applications, the most effective in reducing the number of plants shedding pollen were the 1.0% and 3.0% concentrations applied at the pollen mother cell stage. These reduced the number of plants shedding pollen from the 97.8% check to 38.3% and 26.1%, respectively. The 1.0% and 3.0% concentrations applied singly at the early bolting stage were also quite effective in this respect.

At the same time, it was observed that the single applications of the lowest concentrations had the least effect on the yield of seed. There were indications that repeated applications at the highest concentration had varying adverse effects on the yield of seed. With regard to the highest germination rate of seedballs tested, the 0.33% concentration applied singly at the early bolting stage was the most effective followed by the 0.33% concentration applied singly at the pollen mother cell stage.

The field test indicated that the process empolyed was effective in preventing or delaying the shedding of pollen. Excessive dosages are to be avoided in order not to affect adversely the yield and germination of the hybrid seed produced.

Test data have also established that the physiological responses of sugar beets to the sodium salt of 2,3-dichloroisobutyric acid are characteristic of the responses induced by the free acid itself and by other salts and by the other chlorinated aliphatic carboxylic acids and their salts heretofore described. While there will, of course, be variations from chemical to chemical and population to population, there is realized in all instances the valuable objects of this invention. It is now possible from the teaching of this invention to induce male sterility in sugar beets by a selective gametocidal process employing specifically defined materials. Induced male sterility provides a means of readily cross-fertilizing sugar beets and, hence, makes possible the utilization of hybrid vigor in the production of sugar beets. There is hereby provided a means for the sugar beet industry to produce commercial quantities of hybrid sugar beets.

We claim:
1. A selective gametocidal process for inducing male sterility in cultivated forms of the species *Beta vulgaris*, L. which comprises planting at least two populations of cultivated forms of the species *Beta vulgaris*, L. in proximate relationship with each other but sufficiently segregated to permit treatment of a selected population without substantial exposure of the other population, said treatment comprising applying to said selected population before flowering thereof at least one compound which in water-solution forms anions of a chlorinated aliphatic carboxylic acid that contains from three to four carbon atoms and from two to four chlorine atoms at a concentration of from 0.1 to 4.0% by weight of said compound in an inert carrier and at a total dosage of from one pound to seventy-five pounds per acre, said dosage being less than that which causes serious plant injury or serious seed impairment, continuing growth of said population with development of flowers thereon, fertilizing flowers of the treated plants by the application of pollen from untreated plants, allowing the seed to mature on said treated plants, and collecting the seed therefrom.

2. A selective gametocidal process for inducing male sterility in cultivated forms of the species *Beta vulgaris*, L. which comprises planting at least two populations of cultivated forms of the species *Beta vulgaris*, L. in proximate relationship with each other but sufficiently segregated to permit treatment of a selected population without substantial exposure of the other population, said treatment comprising applying to said selected population before flowering thereof at least one compound which in water-solution forms anions of a chlorinated aliphatic carboxylic acid that contains from three to four carbon atoms and from two to four chlorine atoms at a concentration of from 0.25 to 2.0% by weight of said compound in an inert carrier and at a total dosage of from two and one-half to twenty-five pounds per acre, said dosage being less than that which causes serious plant injury or serious seed impairment, continuing growth of said population with development of flowers thereon, fertilizing flowers of the treated plants by the application of pollen from untreated plants, allowing the seed to mature on said treated plants, and collecting the seed therefrom.

3. The process of claim 2 wherein the cultivated form of the species *Beta vulgaris*, L. is sugar beet.

4. A process according to claim 2 in which said compound is sodium 2,3-dichloroisobutyrate.

5. A selective gametocidal process for inducing male sterility in sugar beets which comprises planting at least two populations of sugar beets in proximate relationship with each other but sufficiently segregated to permit treatment of a selected population without substantial exposure of the other population, said treatment comprising applying to said selected population before flowering thereof at least one compound which in water-solution forms anions of a chlorinated aliphatic carboxylic acid that contains from three to four carbon atoms and from two to four chlorine atoms at a concentration of from 0.25 to 2.0% by weight of said compound in an inert carrier and at a total dosage of from two and one-half to twenty-five pounds per acre, said dosage being less than that which causes serious plant injury or serious seed impairment, said treatment being applied at least at the emergence stage, continuing growth of said population with development of flowers thereon, fertilizing flowers of the treated plants by the application of pollen from untreated plants, allowing the seed to mature on said treated plants, and collecting the seed therefrom.

6. A selective gametocidal process for inducing male sterility in sugar beets which comprises planting at least two populations of sugar beets in proximate relationship with each other but sufficiently segregated to permit treatment of a selected population without substantial exposure of the other population, said treatment comprising applying to said selected population before flowering thereof at least one compound which in water-solution forms anions of a chlorinated aliphatic carboxylic acid that contains from three to four carbon atoms and from two to four chlorine atoms at a concentration of from 0.25 to 2.0% by weight of said compound in an inert carrier and at a total dosage of from two and one-half to twenty-five pounds per acre, said dosage being less than that which causes serious plant injury or serious seed impairment, said treatment being applied at least at the emergence and early bolting stages, continuing growth of said population with development of flowers thereon, fertilizing flowers of the treated plants by the application of pollen from untreated plants, allowing the seed to mature on said treated plants, and collecting the seed therefrom.

7. A selective gametocidal process for inducing male sterility in sugar beets which comprises planting at least two populations of sugar beets in proximate relationship with each other but sufficiently segregated to permit treatment of a selected population without substantial exposure of the other population, said treatment comprising applying to said selected population before flowering thereof at least one compound which in water-solution forms anions of a chlorinated aliphatic carboxylic acid that contains from three to four carbon atoms and from two to four chlorine atoms at a concentration of from 0.25 to 2.0% by weight of said compound in an inert carrier and at a total dosage of from two and one-half to twenty-five pounds per acre, said dosage being less than that which causes serious plant injury or serious seed impairment, said treatment being applied at the emergence, early bolting, and pollen mother cell stages, continuing growth of said population with development of flowers thereon, fertilizing flowers of the treated plants by the application of pollen from untreated plants, allowing the seed to mature on said treated plants, and collecting the seed therefrom.

8. A selective gametocidal process for inducing male sterility in sugar beets which comprises planting at least two populations of sugar beets in proximate relationship with each other but sufficiently segregated to permit treatment of a selected population without substantial exposure of the other population, said treatment comprising applying to said selected population before flowering thereof at least one compound which in water-solution forms anions of a chlorinated aliphatic carboxylic acid that contains from three to four carbon atoms and from two to four chlorine atoms at a concentration of from 0.25 to 2.0% by weight of said compound in an inert carrier and at a total dosage of from two and one-half to twenty-five pounds per acre, said dosage being less than that which causes serious plant injury or serious seed impairment, said treatment being applied at least by the early bolting stage, continuing growth of said population with development of flowers thereon, fertilizing flowers of the treated plants by the application of pollen from untreated plants, allowing the seed to mature on said treated plants, and collecting the seed therefrom.

9. A selective gametocidal process for inducing male sterility in sugar beets which comprises planting at least two populations of sugar beets in proximate relationship with each other but sufficiently segregated to permit treatment of a selected population without substantial exposure of the other population, said treatment comprising applying to said selected population before flowering thereof at least one compound which in water-solution forms anions of a chlorinated aliphatic carboxylic acid that contains from three to four carbon atoms and from two to four chlorine atoms at a concentration of from 0.25 to 2.0% by weight of said compound in an inert carrier and at a total dosage of from two and one-half to twenty-five pounds per acre, said dosage being less than that which causes serious plant injury or serious seed impairment, said treatment being applied at the pollen mother cell stage, continuing growth of said population with development of flowers thereon, fertilizing flowers of the treated plants by the application of pollen from untreated plants, allowing the seed to mature on said treated plants, and collecting the seed therefrom.

10. A process according to claim 5 in which said compound is sodium 2,3-dichloroisobutyrate.

11. A process according to claim 6 in which said compound is sodium 2,3-dichloroisobutyrate.

12. A process according to claim 7 in which said compound is sodium 2,3-dichloroisobutyrate.

13. A process according to claim 8 in which said compound is sodium 2,3-dichloroisobutyrate.

14. A process according to claim 9 in which said compound is sodium 2,3-dichloroisobutyrate.

References Cited in the file of this patent

UNITED STATES PATENTS

| 2,880,082 | Toornman | Mar. 31, 1959 |
| 2,889,662 | Eaton et al. | June 9, 1959 |

OTHER REFERENCES

Publication: Chemical Abstracts, volume 46, published 1952, column 9673, article, "Male Sterile Plants by Chemical Treatment."